ORTHODONTIC BRACKET

Filed April 3, 1961 2 Sheets-Sheet 1

INVENTORS.
PERCY RAYMOND BEGG
ARTHUR CHUN-HOON
BY
Christie, Parker & Hale
ATTORNEYS.

Jan. 5, 1965

P. R. BEGG ETAL 3,163,933

ORTHODONTIC BRACKET

Filed April 3, 1961

2 Sheets-Sheet 2

INVENTORS.
PERCY RAYMOND BEGG
ARTHUR CHUN-HOON
BY
Christie, Parker & Hale
ATTORNEYS.

United States Patent Office 3,163,933
Patented Jan. 5, 1965

3,163,933
ORTHODONTIC BRACKET

Percy Raymond Begg, Springfield, South Australia, Australia (170 North Terrace, Adelaide, South Australia, Australia), and Arthur Chun-Hoon, 350 Alexander Young Bldg., Honolulu 13, Hawaii Filed Apr. 3, 1961, Ser. No. 100,415
Claims priority, application Australia Sept. 12, 1960
4 Claims. (Cl. 32—14)

This invention relates to an orthodontic bracket of the type adapted to be attached to a tooth band. Orthodontic brackets of this character are employed primarily for the purpose of applying, through one or more mechanical expedients, a moving force to the tooth on which they are banded.

The conventional edgewise technique of applying this moving force is characterized by the use of a bracket having a rectangularly sectioned arch wire receiving slot, force in this instance being applied to the tooth by application of an angular torque to a mating square sectioned arch wire.

A somewhat different technique of current importance has become referred to as the Begg light wire technique. This technique is described in considerable detail in the "American Journal of Orthodontics," vol. 42, No. 7, July 1956, at page 48, in an article entitled "Differential Force in Orthodontic Treatment" by Dr. P. R. Begg. Briefly, this technique is characterized by the application of a light, round sectioned arch wire, the force being applied to the tooth bracket by a different form of attachment of this light wire to the bracket, as will be hereinafter illustrated, and an application of energy to the wire through a spring storage means, all as described in the above referenced article.

We have now developed an orthodontic bracket which, in its simplest embodiment, is ideally suited for use in the Begg light wire technique and, in a more sophisticated embodiment, is interchangeably usable for both the Begg light wire technique and the edgewise technique. Both of these techniques have their advantages under differing circumstances, and it is quite conventional that both techniques will be used at different times on the same patient. Accordingly, a bracket which permits this flexibility of use is a very great advantage to the orthodontist.

In the first form noted above, the bracket of the invention comprises a body having a base surface for attachment to the associated tooth band, a channel formed in the body member opening toward the base and gingival surfaces to receive a light arch wire, an inclined slot passing through the body transversely of the channel or gingival side and, as an important aspect, inclining from its proximity to the labial surface of the body in the area of the channel to proximity to the base surface of the body at the side of the body opposite the channel or occlusal side, and a mating lock pin adapted to project through the slot to engage and retain a light arch wire disposed in the channel. As will be understood by anyone familiar with orthodontia, the bracket preferably includes projecting flanges at its base with the direction of projection in this instance parallel to the light arch wire channel. Although the body may be directly soldered at its base surface to the tooth band, the provision of such projections permits the relatively simpler technique of spot welding to the tooth band.

In its form for either edgewise or light arch wire application, a bracket of the invention comprises a body member having a base surface as before, for attachment to the tooth band and preferably with projecting flanges to accomplish this objective. The opposite or labial surface of the body is provided with a rectangularly sectioned channel adapted to receive a similarly sectioned arch wire. The body also is shaped to provide a pair of downwardly opening channel members overhanging the base surface and on opposite sides of the body, and extending parallel to the rectangularly sectioned slot. Further, the body has an inclined slot passing therethrough transversely of the several described channels, and again inclining from a proximity to the labial surface at one side of the body to a proximity to the base surface at the other side of the body. To complete the bracket, a lock pin sectioned to project through the transverse slot is provided for the purpose of engaging and retaining a light arch wire in the base opening channel lying on the side of the body corresponding to the labial proximity of the locking pin slot.

The invention will be readily understood from the following description thereof taken in conjunction with the accompanying drawings, in which.

Figures 1, 2, 3:
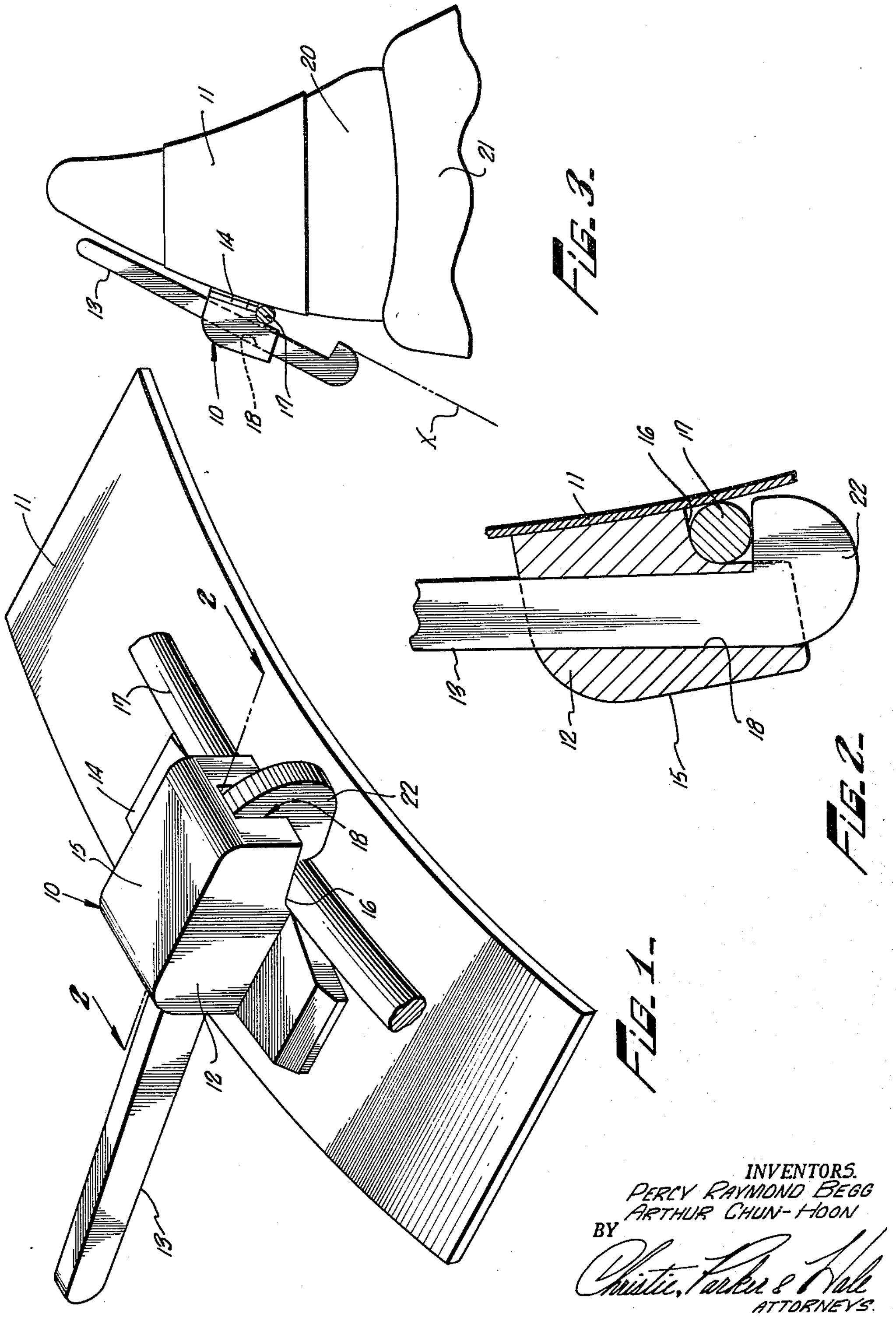
FIG. 1 is an isometric view of the bracket in its simplest embodiment for the single purpose light arch wire use.
FIG. 2 is a vertical section taken on the line 2—2 of FIG. 1.
FIG. 3 is an elevation view of a tooth structure having a bracket in accordance with FIG. 1 mounted thereon.

Referring to FIG. 1, a bracket 10 is illustrated in isometric view as attached to a tooth band 11. The tooth band 11 is, in practice, fastened around a tooth and serves the purpose of affixing the bracket 10 to the tooth. This tooth band and its manner of application to the tooth forms no part of this invention. The bracket 10 is a two-part member including a body 12 and a lock pin 13. The body 12 has a base 14 which, in the illustration, although not necessarily, comprises flange members extending from the body, the base surface of which lies on the tooth band 11.

As noted above, the inclusion of flanges 14 represents a preferred construction since it enables the bracket 10 to be spot welded to the band 11. This is considered by many to be superior to the soldered connection of the bracket to the tooth band, as is necessary if the body 12 is not provided with flanges 14.

In conventional terminology, the outer surface 15 of the body as shown in the drawing is referred to as the labial surface in opposition to the base surface, and this terminology will be used throughout the following description and claims.

The body 12 is shaped to overhang the base 14 to form a channel 16 opening toward the base surface of the bracket and which, in the drawing, is occupied by a light arch wire 17. This light arch wire channel is preferably formed close to the base surface so that the force applied by the retained arch wire will be adjacent the tooth band. A slot 18 passes through the body 12 transversely of the channel 16 and is inclined from a proximity to the labial surface at the side of the body forming the channel 16 to a proximity to the base surface at the side of the body opposite the channel 16. The inclination of this slot is clearly shown in FIG. 2, which is a vertical section taken on the line 2—2 of FIG. 1. The inclination of this slot 16 is very important in this embodiment of the bracket, since it permits the insertion of the locking pin 13 on an angle separating the head of the pin from the surrounding gums during the process of insertion.

This function of the angled locking pin slot is illustrated in FIG. 3, which shows the application of the bracket 10 to a tooth having a neck portion 20 projecting from gum tissue 21. A projection line "X" shows the path of the head of the lock pin 13 and it will be observed that where the lock pin slot 18 is lying parallel to the base of the bracket, it would be difficult to avoid scraping the lock pin against the patient's gums 21 in the process of insertion. This pin has a very small lateral dimension in the order of a few thousandths of an inch and acts like a knife blade in contact with soft tissue. Thus it will be seen that the slot 18 is inclined downwardly with respect to the base 14 from the portion of the bracket 10 adjacent the tooth neck 20.

The lock pin 13, as shown in some detail in FIG. 1, includes a head 22 which, upon insertion of the pin as illustrated in the figure, engages and retains the arch wire 17 in the arch wire channel 16. In conventional practice, the tail portion of the lock pin is crimped off against the body on the side opposite the arch wire to complete the assembly. Preferably, the lock pin slot is of non-circular section, as, for example, rectangular as shown, and the lock pin is similarly sectioned to prevent rotation of the in-place pin.

As mentioned above, both the light wire and the more conventional edgewise technique have their particular advantages under different circumstances. Accordingly, it will be to the advantage of most orthodontists to have brackets which are interchangeably usable for both techniques. Such a bracket is shown in isometric view in FIG. 4 assembled for use in the edgewise technique. In this figure the bracket 30 is shown applied to the tooth band 31. The bracket has a body 32 having a flange base 33 for attachment by spot welding to the tooth band. The labial surface of the body 32 is provided with a rectangularly sectioned slot 34 adapted to receive a similarly sectioned arch wire 35.

The body is shaped at its opposite sides to form two channels 36, 37 running parallel to the channel 34 and opening toward the base. In this design, the channel 36 is formed by an overhanging lip 38 at the labial surface of the body and can be differentiated from the companion channel 37 by the labial tie wire channel. The channel 37, for purposes hereinafter made apparent, is formed by a cut-away in the body adjacent the base surface. It is important that the channel 37, which may be referred to as the light arch wire channel, lie closely proximate to the base, whereas there is no such requirement with respect to the tie wire channel 36. The bracket 30 also is provided with a lock key slot 39 extending from side to side of the bracket and transversely of the channels. Also in this embodiment, as in FIG. 1, and as shown in detail in the vertical section of FIG. 2, the locking pin slot is inclined from proximity to the labial surface at the side of the body having the arch wire channel 37 to a proximity to the base surface at the opposite side of the body.

Figures 4, 5:
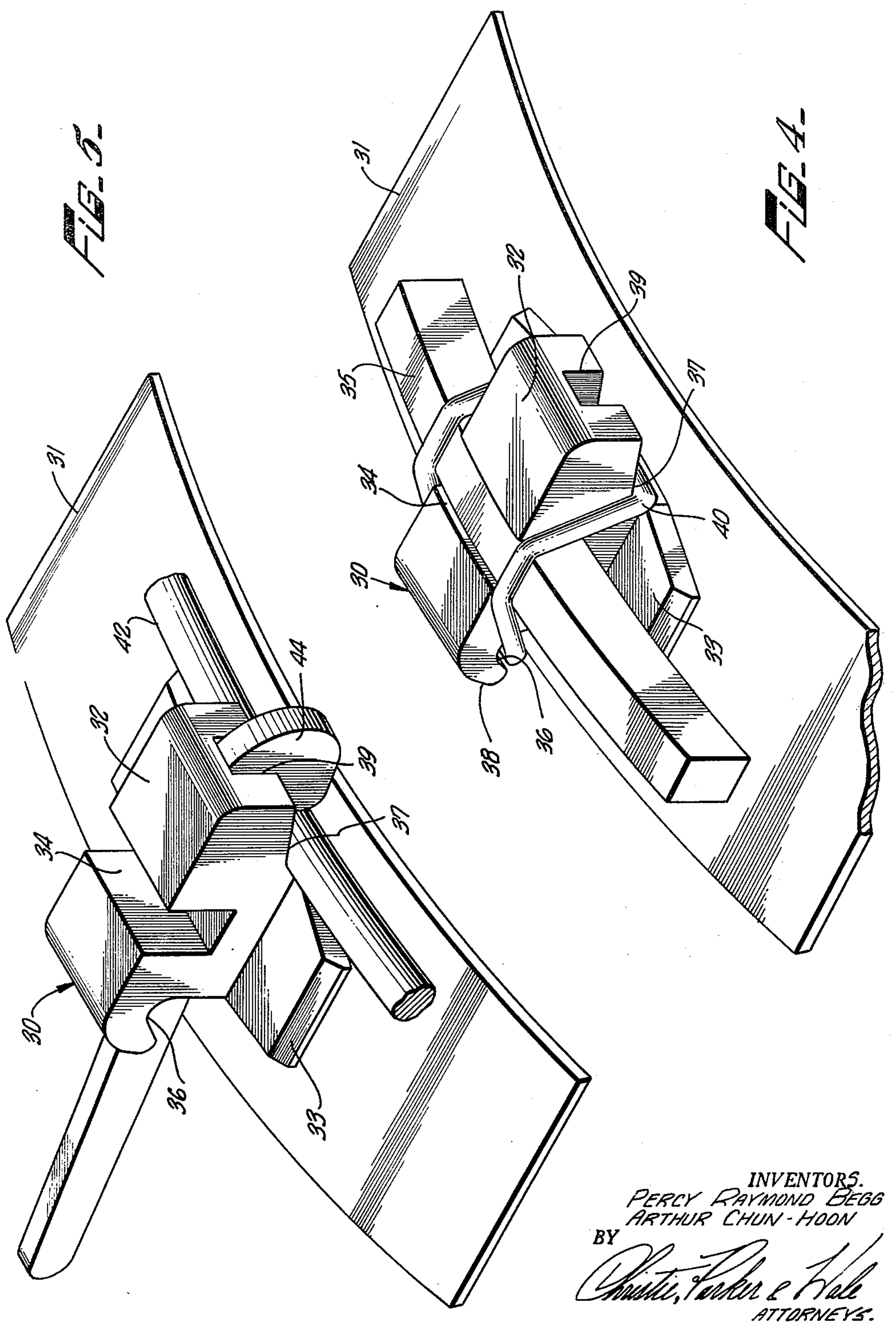
FIG. 4 is an isometric view of a combination bracket shown in this instance as it would be used with the edgewise technique.
FIG. 5 is an isometric view of the same combination bracket showing its use in the light arch wire technique.

In the use of the multi-purpose bracket in conventional edgewise technique as shown in FIG. 4, the locking pin slot has no function and the proximity of the channel 37 to the base is of no import. The arch wire 35 is passed through the arch wire channel 34 and is retained therein in conventional fashion by a tie wire 40. The arch wire and the tie wire are conventional in the trade and form no part of the present invention. However, in this instance the tie wire is engaged on one side of the body in the normal tie wire receiving channel 36 and in the other side of the body in the light arch wire receiving channel 37 which, in this bracket, serves a multi-function.

This multi-function is further shown in FIG. 5, which is another isometric view of the same bracket illustrated and described with relation to FIG. 4, illustrated in this instance as it would appear in use in the light arch wire technique. Since the bracket is the same, identical numbers are applied to identical portions thereof in FIGS. 4 and 5. In the light arch wire application, the rectangularly sectioned arch wire slot 34 has no function, and similarly the tie wire channel 36 is not used. On the other hand, the channel 37 is used to receive the light arch wire 42 and a locking pin 44 is inserted through the locking pin slot 39 to hold the light arch wire 42 in the manner described in relation to FIG. 1.

In the several illustrations the body member of the bracket is illustrated in a shape as nearly equivalent to that of the conventional edgewise bracket as is possible under the structural limitations imposed by the invention. It will be realized of course, however, that the invention itself is not limited in any way to the overall shape of the bracket.

What is claimed is:

1. In an orthodontic apparatus for use in the application of lightwire corrective techniques and including a tooth band, a solid metal bracket body, light archwire and a locking pin to fasten the light archwire to the bracket, the improvement comprising:
   (*a*) said bracket body of solid metal having
      (1) a labial surface, gingival and occlusal side surfaces and a relatively flat base surface for attachment to the tooth band,
      (2) a light archwire receiving channel formed by a recess in the body member extending transversely thereacross at the base surface and opening onto the gingival surface,
      (3) a lock pin holding slot extending transversely through the body member generally perpendicularly to the light archwire receiving channel and inclining toward the base surface from the gingival to the occlusal side of the member,
   (*b*) the lock pin being of a cross-sectional configuration generally complementary to the cross-sectional configuration of the lock pin slot and having a head on one end which engages and holds the light archwire in the archwire receiving channel, and
   (*c*) the end of the lock pin opposite the head being adapted to be deformed so that the lock pin is retained in the lock pin channel by engagement at one end of the lock pin head with the light archwire and at the other end by engagement of a deformed portion of the lock pin with the body member.

2. In orthdontic apparatus for use in the application of lightwire and edgewise corrective techniques and including a tooth band, a solid metal bracket body, archwire, tie wire to fasten the archwire to the bracket in the application of the edgewise technique, lightwire, and a locking pin to fasten the lightwire to the bracket in the application of the lightwire technique, the improvement comprising said bracket body of solid metal having
   (*a*) a labial surface, gingival and occlusal side surfaces and a relatively flat base surface for attachment to the tooth band,
   (*b*) a recess extending across the base opening at the gingival side surface and of such size to receive alternately the lightwire and tie wire,
   (*c*) a slot extending transversely therethrough generally perpendicularly to and opening into the recess, the slot being shaped to receive and house the locking pin,
   (*d*) a groove in the labial surface extending parallel to the recess and shaped to receive and hold the archwire, and
   (*e*) a channel in the occlusal side surface extending parallel to the labial groove, the channel and recess serving as complementary anchors for the tie wire to fasten the archwire to the bracket.

3. In orthodontic apparatus for use in the application of lightwire and edgewise corrective techniques and including a tooth band, a solid metal bracket body, archwire, tie wire to fasten the archwire to the bracket in the application of the edgewise technique, lightwire, and a locking pin to fasten the lightwire to the bracket in the application of the lightwire technique, the improvement comprising said bracket body of solid metal having
   (*a*) a labial surface, gingival and occlusal side surfaces and a relatively flat base surafce for attachment to the tooth band, (b) a recess extending across the base opening at the gingival side surface and of such size to receive alternately the lightwire and tie wire, (c) a slot extending transversely therethrough generally perpendicularly to and opening into the recess and inclined toward the base from the gingival to the occlusal sides of the body, the slot being shaped to receive and house the locking pin, (d) a groove in the labial surface extending parallel to the recess and shaped to receive and hold the archwire, and (e) a channel in the occlusal side surface extending parallel to the labial groove, the channel and recess serving as complementary anchors for the tie wire to fasten the archwire to the bracket.

4. In orthodontic apparatus for use in the application of lightwire and edgewise corrective techniques and including a tooth band, a solid metal bracket body, achwire, tie wire to fasten the archwire to the bracket in the application of the edgewise technique, lightwire, and a locking pin to fasten the lightwire to the bracket in the application of the lightwire technique, the improvement comprising said bracket body of solid metal having (a) a labial surface, gingival and occlusal side surfaces and a relatively flat base surface for attachment to the tooth band, (b) a recess extending across the base opening at the gingival side surface and of such size to receive alternately the lightwire and tie wire, (c) a slot extending transversely therethrough generally perpendicularly to and opening into the recess and inclined toward the base from the gingival to the occlusal sides of the body, the slot being of a non-circular cross-sectional shape conforming to that of the locking pin to house and prevent rotation of the pin, (d) a groove in the labial surface extending parallel to the recess and of a depth less than the depth of the body member from the labial surface to the base, the groove being shaped to receive and hold the archwire, and (e) a channel in the occlusal side surface extending parallel to the labial groove, the channel and recess serving as complementary anchors for the tie wire to fasten the archwire to the bracket.

References Cited in the file of this patent

UNITED STATES PATENTS

| | | |
|---|---|---|
| 1,821,171 | Atkinson | Sept. 1, 1931 |
| 2,257,069 | Peak | Sept. 23, 1941 |
| 2,527,526 | Brusse | Oct. 31, 1950 |
| 2,958,945 | Waldman | Nov. 8, 1960 |